(12) United States Patent
Yamada et al.

(10) Patent No.: US 6,907,134 B1
(45) Date of Patent: Jun. 14, 2005

(54) PERSONAL IDENTIFICATION DEVICE AND METHOD

(75) Inventors: Junichiro Yamada, Kyoto (JP); Yoshiharu Nishikawa, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 09/524,693

(22) Filed: Mar. 14, 2000

(30) Foreign Application Priority Data

Mar. 18, 1999 (JP) .......................................... 11/073561

(51) Int. Cl.⁷ ................................................ G06K 9/00
(52) U.S. Cl. ...................... 382/115; 340/5.82; 235/380; 713/186
(58) Field of Search ................................ 352/115, 116, 352/117, 118, 155, 190; 713/155, 170, 186, 165, 173; 340/5.8, 5.81, 5.82, 5.83, 5.86; 705/1, 37, 26, 42; 235/382, 380; 348/143

(56) References Cited

U.S. PATENT DOCUMENTS

| | | | | |
|---|---|---|---|---|
| 4,993,068 A | * | 2/1991 | Piosenka et al. | ............ 713/186 |
| 5,095,196 A | * | 3/1992 | Miyata | ........................ 235/382 |
| 5,144,680 A | | 9/1992 | Kobayashi et al. | ............ 382/4 |
| 5,202,929 A | * | 4/1993 | Lemelson | ................... 382/116 |
| 5,214,699 A | * | 5/1993 | Monroe et al. | ............. 713/186 |
| 5,432,864 A | * | 7/1995 | Lu et al. | ...................... 382/118 |
| 5,503,157 A | * | 4/1996 | Sramek | ....................... 600/506 |
| 5,870,723 A | * | 2/1999 | Pare, Jr. et al. | ................ 705/39 |
| 6,016,476 A | * | 1/2000 | Maes et al. | .................... 705/26 |
| 6,484,260 B1 | * | 11/2002 | Scott et al. | ................. 713/186 |

FOREIGN PATENT DOCUMENTS

| | | |
|---|---|---|
| DE | 37 06 466 | 9/1988 |
| EP | 0 379 333 | 7/1990 |
| FR | 2 634 570 | 1/1990 |
| WO | WO 91/06920 | 5/1991 |
| WO | WO 94/10659 | 5/1994 |
| WO | WO 98/01820 | 1/1998 |

* cited by examiner

*Primary Examiner*—Bhavesh M. Mehta
*Assistant Examiner*—Sheela Chawan
(74) *Attorney, Agent, or Firm*—Foley & Lardner LLP (57) ABSTRACT

A personal identification device for executing personal identification by employing living body characteristics of a user. The device includes an identification condition data reader for reading identification condition data specifying at least one living body characteristic stored in a portable storage media carried by the user for the personal identification, a living body characteristic detector for detecting from the user the living body characteristic corresponding to the identification condition data read by the identification condition data reader, and an identifier for performing personal identification by comparing the living body characteristic detected by the living body characteristic detector with the living body characteristic data of users previously obtained.

10 Claims, 5 Drawing Sheets

PERSONAL IDENTIFICATION DEVICE AND METHOD

BACKGROUND OF THE INVENTION

1. Field of the Invention

This invention relates to a personal identification device and method for executing personal identification by employing living body characteristics such as a finger print, a voice print, a face-image or the like, and more particularly to an improved personal identification device and method for executing personal identification by specifying living body characteristics to be used for personal identification based on the identification condition data stored in a portable storage media such as an IC card or the like carried by a user.

2. Description of the Related Art

It is well known to use a personal identification device for executing personal identification by employing living body characteristics such as a finger print, a voice print, a face-image or the like, which is employed in a car navigation, a notebook personal computer, an electronic note, and various mobile machines. The conventional personal identification device previously stores therein the data representing plural living body characteristics (hereinafter called as "bio-data"), such as finger print data of a specific finger, voice print data, and face-image data of a user. As the device is actuated, it compares the previously stored bio-data with the bio-data taken from the user to execute personal identification, whereby unauthorized use by another person is prevented.

The conventional personal identification device, however, is designed for a single living body characteristic item. A conventional finger print identification terminal is designed only for identification by a finger print; a conventional voice print identification terminal is designed only for identification by a voice print; and an image identification terminal is designed only for identification by a face. Thus, a conventional personal identification device designed for such a single living body characteristic item sometimes cannot be used by a handicapped person or an injured person to execute precise personal identification.

SUMMARY OF THE INVENTION

It is, therefore, a primary object of this invention to provide a personal identification device and method capable of executing personal identification employing a plurality of living body characteristics with high security in accordance with the need by users.

According to a first aspect of this invention, there is provided a personal identification device for executing personal identification by employing living body characteristics of a user which includes an identification condition data reader for reading identification condition data specifying at least one living body characteristic stored in a portable storage media carried by the user for the personal identification, a living body characteristic detector for detecting from the user the living body characteristic data corresponding to the identification condition data read by the identification condition data reader, and an identifier for performing personal identification by comparing the living body characteristic data detected by the living body characteristic detector with the living body characteristic data of users previously obtained, whereby the personal identification employing plural living body characteristic data in accordance with the need by users may be performed and high security is realized.

According to a modification of the personal identification device of the first aspect, the portable storage media stores therein an identification algorithm for personal identification employing the living body characteristic data together with the living body characteristic data, and the identifier performs the personal identification by transferring the living body characteristic data detected from the user by the living body characteristic detector to the portable storage media, whereby personal identification may be performed even when an identification algorithm for living body characteristic data does not exist in the device itself.

According to another modification of the personal identification device of the first aspect, the portable storage media stores therein the living body characteristic data, the identification condition reader reads the living body characteristic data from the portable storage media together with the identification condition data, and the identifier performs the personal identification by comparing the living body characteristic data detected from the user by the living body characteristic detector with the living body characteristic data read from the portable storage media, whereby the device itself is not necessary to store any living body characteristic data to be compared and the personal identification employing plural living body characteristic data may be performed with large degrees of freedom.

According to a second aspect of this invention, there is provided a personal identification apparatus for performing personal identification by employing living body characteristics of a user having a central device, and a plurality of personal identification terminals each of which includes an identification condition data reader for reading identification condition data specifying at least one living body characteristic data stored in a portable storage media carried by a user, a living body characteristic detector for detecting from the user the living body characteristic corresponding to the identification condition data read by the identification condition data reader, an identifier for performing personal identification by comparing the living body characteristic detected by the living body characteristic detector with the living body characteristic data of users obtained previously, and a communicator for communicating with the central device, whereby the personal identification employing plural living body characteristic data in accordance with the need by users may be performed by a central management.

According to a modification of the personal identification apparatus of the second aspect of this invention, the center device stores and manages the living body characteristic data for each user, revises the living body characteristic data for each user stored and managed by communication with each of the personal identification terminals, and generally controls identification results of users from the personal identification terminals, whereby centralized management also may be performed for the living body characteristic data used for personal identification.

According to a third aspect of this invention, there is provided a personal identification method for detecting living body characteristics of a user to compare the detected characteristics with the living body characteristic data previously obtained about the user to execute personal identification, which includes the steps of storing identification condition data specifying at least one living body characteristic for personal identification into a portable storage media to be carried by the user and detecting living body characteristic data corresponding to the identification condition data read from the portable storage media from the user to execute the personal identification, whereby the personal identification employing plural living body characteristic data is performed in accordance with the need of the users and high security is realized.

BRIEF DESCRIPTION OF THE DRAWINGS

Other objectives and advantages of this invention will be more readily apparent from the following detailed description provided in conjunction with the following figures, of which.

DETAILED DESCRIPTION OF THE PREFERRED EMBODIMENT

Figure 1:
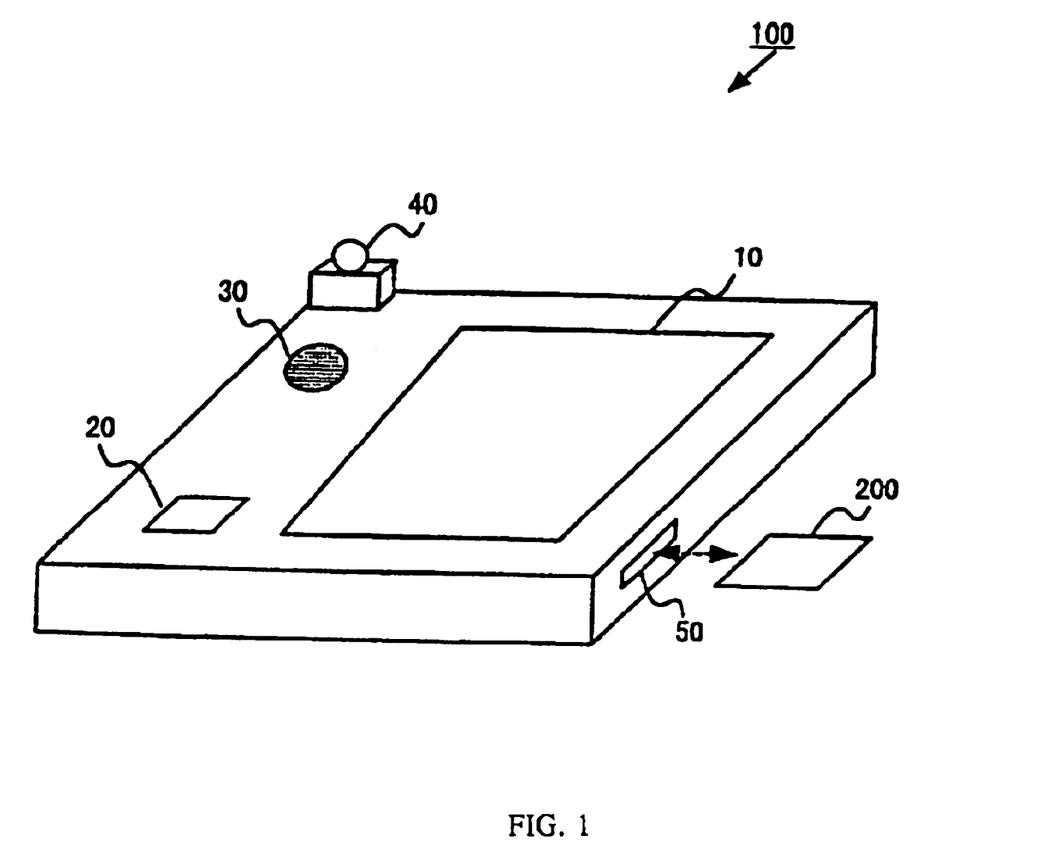
FIG. 1 is a perspective view of a personal identification device according to a preferred embodiment of this invention.

Referring, now, to FIG. 1, there is shown a personal identification device 100 for performing personal, identification employing data representing plural living body characteristics of a user (bio-data), such as finger print data of a particular finger, voice print data, and image data of a face of the user, according to a preferred embodiment of this invention. It includes a CCD sensor for 20 taking finger print data of a particular finger of a user, a microphone 30 for taking voice print data of the user, and a video camera 40 for taking image data of the face of the user. The device 100 further includes an input-and-display panel 10 to enter and display various information and an insertion opening 50 for insertion of the IC card 200 that functions as a portable storage media carried by the user.

The personal identification device 100 of this embodiment is designed to store identification condition data specifying at least one living body characteristics for personal identification into the IC card 200 carried by the user and detect the living body characteristics from the user corresponding to the identification condition data read from the IC card 200. The identification condition data is the data that specifies living body characteristics (hereinafter called "bio") used for personal identification, and read from the IC card 200 by the personal identification device 100 to determine the bio for performing personal identification of the user based on the identification condition data. In the personal identification device 100, there are, by way of example only, and not by way of limitation, set four kinds of bio usable for personal identification including a finger print of a particular finger of a user, a voice print, an image of a face, and signature. The identification condition data is the data showing selection of one or more among the four kinds of bio.

Figure 2:
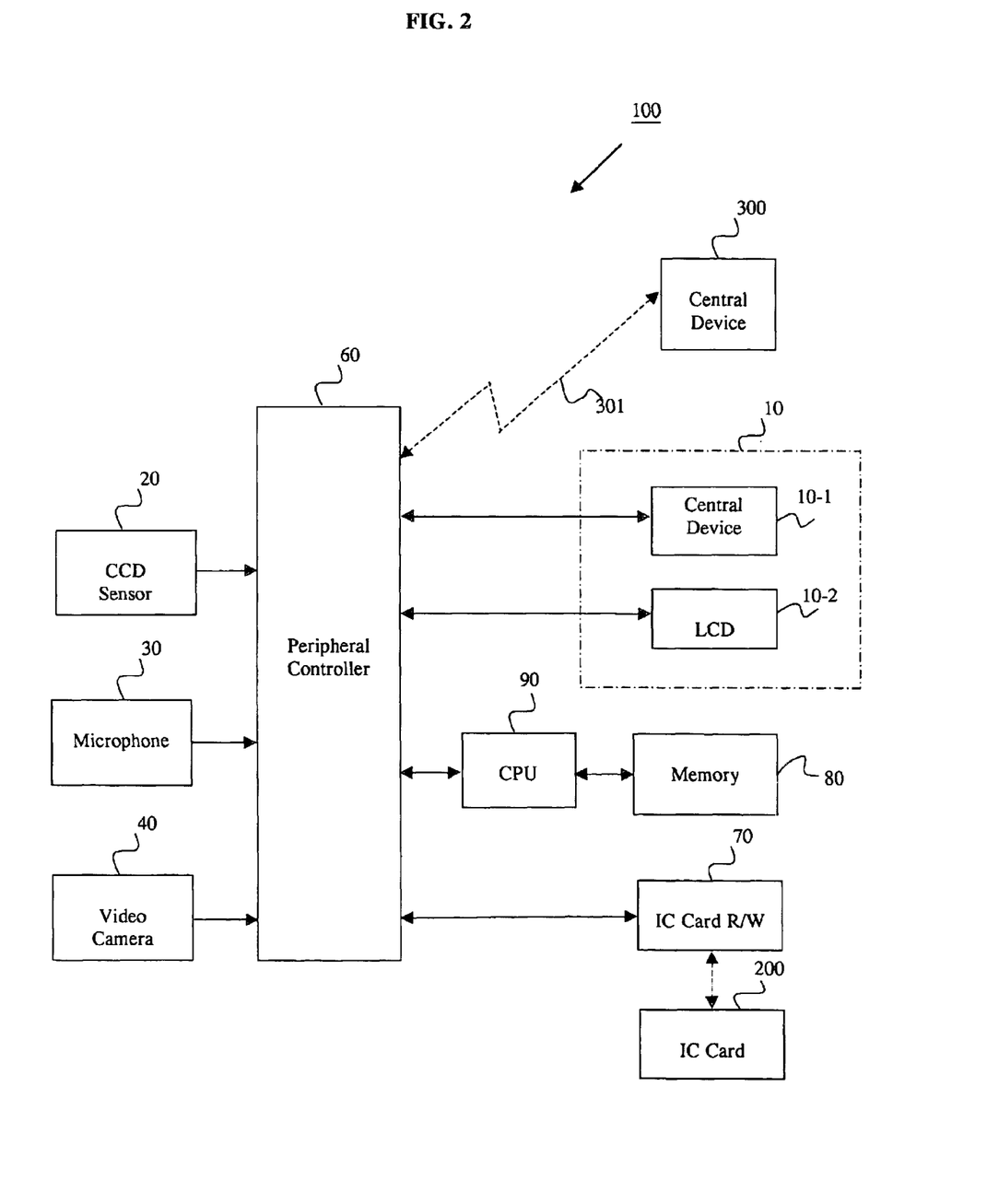
FIG. 2 is a schematic block diagram of the device of FIG. 1.

FIG. 2 is a schematic block diagram of the personal identification device 100 of this embodiment which includes the input-and-display panel 10, the CCD sensor 20, the microphone 30, and the video camera 40 as shown in FIG. 1, and further includes a peripheral controller 60, an IC card read-and-writer (IC card R/W) 70, a memory 80, and a central processing unit (CPU) 90. The peripheral controller 60 is connected with a central device 300 through a line 301 by cable or wireless.

The input-and-display panel 10 is provided with a liquid crystal display (LCD) 10-1 and a touch panel 10-2 mounted on the liquid crystal display 10-1, thereby providing a display function and an input function for various information. The CCD camera 20 is connected with the peripheral controller 60 to read finger print data based on the finger print of a particular finger of a user as one bio used by the personal identification device 100 under the control by the peripheral controller 60. The microphone 30 is connected with the peripheral controller 60 to take voice print data corresponding to the voice print of the user as one bio used by the personal identification device 100 under the control by the peripheral controller 60. The video camera 40 is connected with the peripheral controller 60 to take image data corresponding to a face of the user as one bio used by the personal identification device 100 under the control by the peripheral controller 60.

The peripheral control unit 60 is connected with the CCD camera 20, the microphone 30, the video camera 40, the IC card R/W 70, the CPU 90, and the input-and-display panel 10 to control the entry of the finger print data, the voice print data and the image data of face by the CCD camera 20, the microphone 30 and the video camera 40, the read-and-write operation of the data from the IC card 200 by the IC card R/W 70, and the information input and display operation by the input-and-display panel 10, respectively.

The peripheral control unit 60 is also connected with the central device 300 through the line 301 to transmit and receive various data by communication with the central unit 300. The central device 300 manages the storage of the bio data for each user, revises the bio data for each user to be stored and managed by communication with the personal identification device 100, and generally controls results of the identification of the users by the device 100.

The memory 80 stores therein a control program to operate the CPU 90, and various information to control the personal identification device 100. The CPU 90 is connected with the peripheral controller 60 and the memory 80 generally to control the operations of the respective portions of the personal identification device 100 through the peripheral controller 60 based on the information stored in the memory 80.

Figure 3:
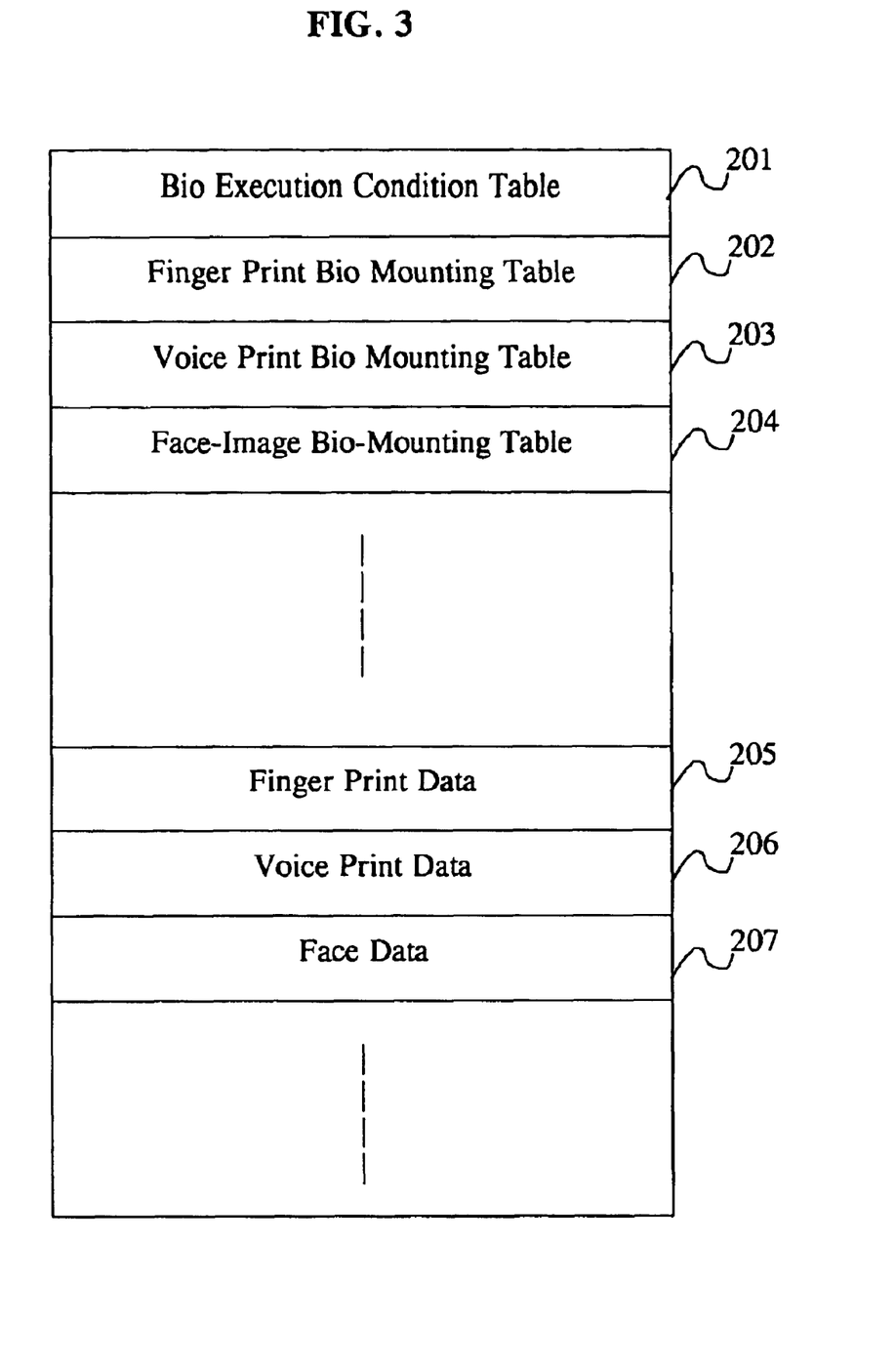
FIG. 3 is one example of information stored in an IC card shown in FIGS. 1 and 2.

FIG. 3 shows one example of the information stored in the IC card 200 of FIGS. 1 and 2 which stores therein a bio execution condition table 201, a finger print bio mounting table 202, a voice print bio mounting table 203, a face bio mounting table 204, finger print data 205, voice print data 206, and face data 207. The bio execution condition table 201 stores therein the above-described identification condition data. The finger print bio mounting table 202, the voice print bio mounting table 203, and the face bio mounting table 204 respectively store therein the data for mounting and dismounting the finger print data 205, the voice print data 206, and the face data 207. These data consist of two values of, [1] representing mounting of the corresponding bio data and [0] representing dismounting of the corresponding bio data.

The finger print data 205 is finger print data corresponding to the finger print of a particular finger of a user which is previously taken and registered from the user. The voice print data 206 is voice print data corresponding to the voice print of the user which is previously taken and registered from the user. The face data 207 is image data corresponding to the face image of the user that is previously taken and registered from the user.

Figure 4:
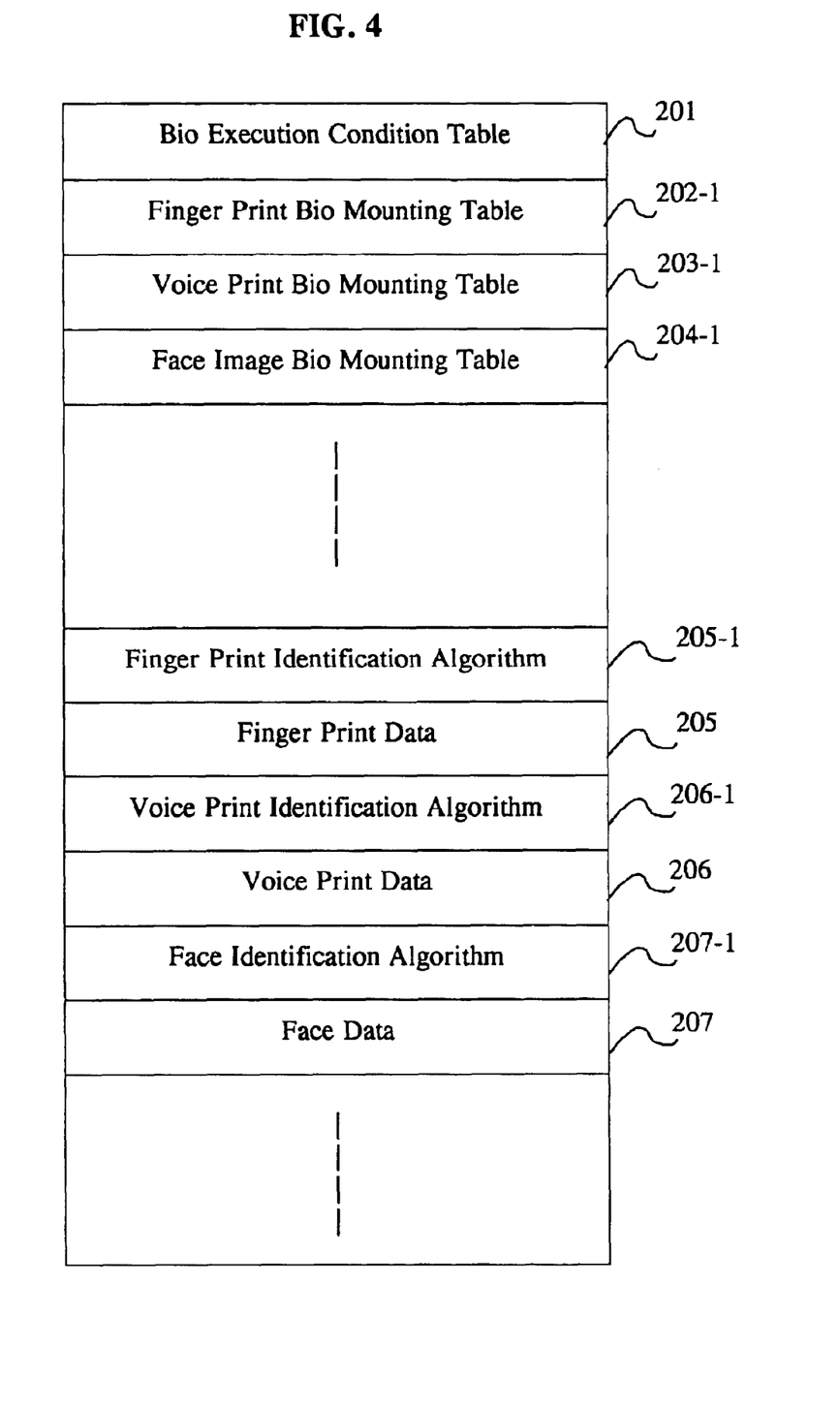
FIG. 4 is another example of information stored in the IC card shown in FIGS. 1 and 2.

FIG. 4 shows another example of the information stored in the IC card 200 of FIGS. 1 and 2. The IC card 200 in the construction of FIG. 4 stores therein a bio execution condition table 201, a finger print bio mounting table 202-1, a voice print bio mounting table 203-1, a face bio mounting table 204-1, a finger print identification algorithm 205-1, finger print data 205, a voice print identification algorithm 206-1, voice print data 206, a face identification algorithm 207-1, and face data 207. Thus, the IC card 200 stores therein the finger print identification algorithm 205-1, the voice print identification algorithm 206-1, and the face identification algorithm 207-1, in addition to the data construction of FIG. 3.

The bio execution condition table 201 of FIG. 4 stores therein the above-described identification condition data. The finger print bio mounting table 202-1, the voice print bio mounting table 203-1, and the face bio mounting table 204-1 respectively store therein the data for mounting or dismounting the finger print data 205, the voice print data 206 and the face data 207, and the data representing if an identification process should be performed within the IC card 200.

These data consist of three values, [1] representing mounting of the corresponding bio data, [0] representing dismounting of the corresponding bio data, and [−1] representing that the identification process employing the corresponding bio should be performed within the IC card 200.

The finger print identification algorithm 205-1, the voice print identification algorithm 206-1, and the face identification algorithm 207-1 respectively represent a finger print identification algorithm, a voice print identification algorithm and a face identification algorithm which employ finger print data, voice print data and image data corresponding to a face.

The finger print data 205 is finger print data corresponding to a finger print of a particular finger of a user which is previously taken and registered from the user. The voice print data 206 is voice print data corresponding to a voice print of the user which is previously taken and registered from the user. The face data 207 is image data corresponding to a face image of the user that is previously taken and registered from the user.

Thus, the IC card 200 in the construction of FIG. 4 stores therein algorithms for finger print identification, voice print identification and face identification to execute finger print identification, voice print identification and face identification within the IC card 200.

Figure 5:
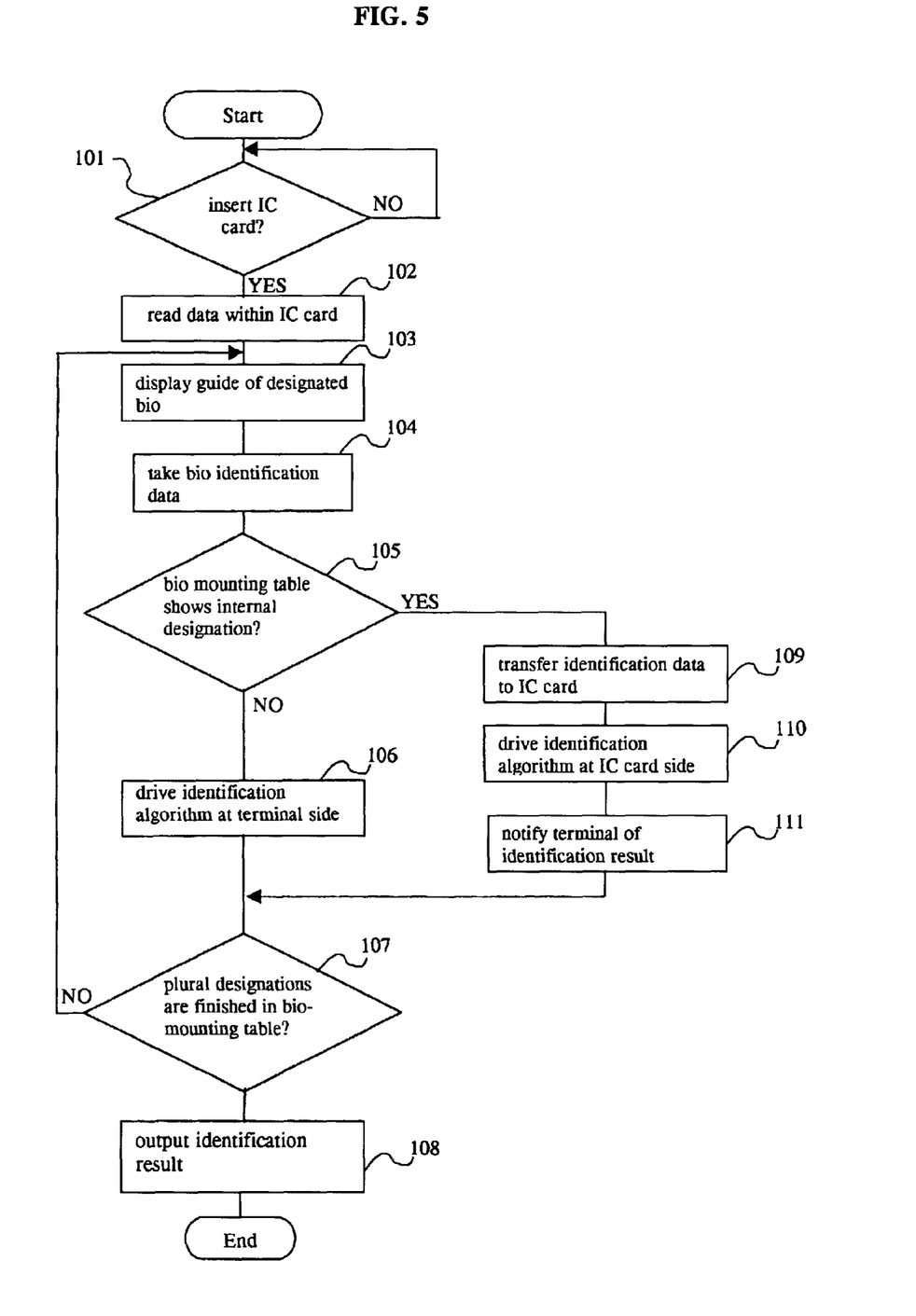
FIG. 5 is a flow chart showing a personal identification operation in the personal identification device of FIGS. 1 and 2.

FIG. 5 is a flow chart showing a personal identification operation in the personal identification device 100 wherein the data stored in the IC card 200 has the construction of FIG. 4.

Upon starting the personal identification operation, it is inquired if the IC card 200 held by the user is installed into the insertion opening 50 in a step 101. If the card 200 is not installed, a NO response is produced in step 101 and the sequence returns to step 101 to wait the installation of the IC card 200 into the insertion opening 50 of the personal identification device 100.

If it is confirmed in the step 101 that the IC card 200 held by the user has been installed into the opening 50, an YES response is produced in the step 101 and the data within the card 200 is read by the IC card R/W 70 in a step 102. A guide as to the bio to be used for personal identification is displayed by the input-and-display panel 10 based on the contents of the bio execution condition table 201 in the data read from the IC card 200 in a step 103. Then, bio identification data is obtained from the user by driving the CCD sensor 20 for taking finger print data of a particular finger of the user, the microphone 30 for taking voice print data from the user, and the video camera 40 for taking image data of a face of the user in a step 104.

The sequence moves to an inquiry step 105 in which it is inquired if the bio mounting table shows internal designation, viz., the identification of the bio should be executed within the IC card 200, referring to the finger print bio mounting table 202-1, the voice print bio mounting table 203-1, and the face bio mounting table 2041 among the data read from the IC card 200.

In this embodiment, if the contents of the finger print bio mounting table 202-1 shows [1], it shows mounting of the finger print bio data. If the contents show [0], it shows dismounting of the finger print bio data. If the contents show [−1], it shows that the identification process employing the finger print bio should be executed within the IC card 200.

If the contents of the voice print bio mounting table 203-1 show [1], it shows mounting of the voice print bio data. If the contents show [0], it shows dismounting of the voice print bio data. If the contents show [−1], it shows that the identification process employing the voice print bio should be executed within the IC card 200.

If the contents of the face bio mounting table 204-1 shows [1], it shows mounting of the face bio data. If the contents show [0], it shows dismounting of the face bio data. If the contents shows [−1], it shows that the identification process employing the face bio should be executed within the IC card 200.

Unless the bio mounting table shows internal designation, viz., the identification of the bio is judged not to be executed within the IC card 200 in the step 105, a NO response is applied to a step 106 in which the identification operation is executed by driving the identification algorithm at a terminal side, viz., at the personal identification device 100.

If the bio mounting table shows internal designation, viz., the identification of the bio is judged to be executed within the IC card 200 in the step 105, a YES response is applied to a step 109 in which the bio identification data obtained from the user is transferred to the IC card 200. Then, the identification operation is executed by driving the identification algorithm at the IC card 200 in a step 110, and the result of the identification is applied to the terminal, viz., the personal identification device 100 in a step 111.

The sequence moves to an inquiry step 107 in which it is inquired if the plural designations have been finished in the bio-mounting table, viz., the identification operation employing all designated bio has been finished. Unless plural designations have been finished in the bio mounting table, viz., unless the identification operation employing all designated bio has been finished, a NO response is produced in step 107 to be applied to the step 103 to repeat the operation from step 103 to step 107.

If it is confirmed in the step 107 that the plural designations have been finished in the bio mounting table, viz., the identification operation employing all designated bio has been finished, a YES response is applied to a step 108 in which the result of the identification is displayed by the input-and-display panel 10, and the sequence is finished.

The operation of the personal identification device 100 has been described above wherein the data stored in the IC card 200 employs the construction of FIG. 4. When the data stored in the IC card 200 employs the construction of FIG. 3, all identification operations are executed in the personal identification device 100, and the operation of step 105 and the operation from the step 109 to step 111 is omitted.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice or the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

We claim:

1. A personal identification device for executing personal identification by employing living body characteristics of a user, comprising:
   an identification condition data reader for reading identification condition data specifying at least one living body characteristic stored in a portable storage media carried by the user for personal identification;
   a living body characteristic detector for detecting from the user the living body characteristic data corresponding to the identification condition data read by said identification condition data reader;
   a peripheral controller to control the living body characteristic detector; and
   an identifier for performing personal identification by comparing the living body characteristic detected by the living body characteristic detector with living body characteristic data of users previously obtained; and
   wherein said portable storage media stores therein an identification algorithm for personal identification employing said detected living body characteristic together with said living body characteristic data, and said identifier performs said personal identification by transferring said living body characteristic data detected from the user by said living body characteristic detector to said portable storage media.

2. A personal identification device according to claim 1 in which said portable storage media stores therein said living body characteristic data, said identification condition data reader reads said living body characteristic data from said portable storage media together with said identification condition data, and said identifier performs said personal identification by comparing said living body characteristics detected from the user by said living body characteristic detector with said living body characteristic data read from said portable storage media.

3. A personal identification device according to claim 1, wherein said portable storage media is an IC card.

4. A personal identification apparatus for performing personal identification by employing living body characteristics of a user having a central device, and a plurality of personal identification terminals, each of said personal identification terminals comprising:
   an identification condition data reader for reading identification condition data specifying at least one living body characteristic stored in a portable storage media carried by a user,
   a living body characteristic detector for detecting from said user the living body characteristic data corresponding to the identification condition data read by said identification condition data reader;
   a peripheral controller to control the living body characteristic detector;
   an identifier for performing personal identification by comparing the living body characteristic data detected by said living body characteristic detector with living body characteristic data of users obtained previously; and
   a communicator for communicating with said central device; and
   wherein said portable storage media stores therein an identification algorithm for personal identification employing said living body characteristics together with said living body characteristic data, and said identifier performs said personal identification by transferring said living body characteristic data detected from the user by said living body characteristic detector to said portable storage media.

5. A personal identification apparatus according to claim 4 in which said portable storage media stores therein said living body characteristic data, said identification condition data reader reads said living body characteristic data from said portable storage media together with said identification condition data, and said identifier performs said personal identification by comparing said living body characteristics detected from the user by said living body characteristic detector with said living body characteristic data read from said portable storage media.

6. A personal identification apparatus according to claim 4, in which said central device stores and manages said living body characteristic data for each user, raises said living body characteristic data for each user stored and managed by communication with each of said personal identification terminals, and controls identification results of users from said personal identification terminals.

7. A personal identification apparatus according to claim 4, wherein said portable storage media is an IC card.

8. A personal identification method for detecting living body characteristics of a user to compare the detected characteristics with the living body characteristic data previously obtained about the user to execute personal identification, comprising the steps of:
   storing identification condition data specifying at least one living body characteristic for the personal identification into a portable storage media carried by the user; and
   detecting living body characteristic data corresponding to the identification condition data read from said portable storage media from the user to execute the personal identification,
   wherein detecting the living body characteristic data comprises operating a living body characteristic detector controlled by a peripheral controller;
   transferring the living body characteristic data detected from said user to said portable storage media for personal identification; and
   executing an identification algorithm stored on said portable storage media for comparison of said identification condition data stored on said portable storage media and said living body characteristic data detected from said user.

9. A personal identification method according to claim 8, wherein said portable storage media is an IC card.

10. A personal identification system for executing personal identification by employing living body characteristics of a user, comprising:
    a portable storage media adapted to be carried by a user; and
    a personal identification device, said personal identification device comprising:
      an identification condition data reader for reading identification condition data specifying at least one living body characteristic stored in said portable storage media;

a living body characteristic detector for detecting from the user the living body characteristic data corresponding to the identification condition data read by said identification condition data reader;

a peripheral controller to control the living body characteristic detector; and an identifier for performing personal identification by comparing the living body characteristic data detected by the living body characteristic detector with living body characteristic data of users previously obtained, wherein said portable storage media stores therein an identification algorithm for personal identification employing said detected living body characteristic together with said living body characteristic data, and said identifier of said personal identification device performs said personal identification by transferring said living body characteristic data detected from the user by said living body characteristic detector to said portable storage media.

* * * * *